Dec. 31, 1940.  O. GEISLER  2,226,716
PHOTOELECTRIC CELL
Filed July 1, 1939
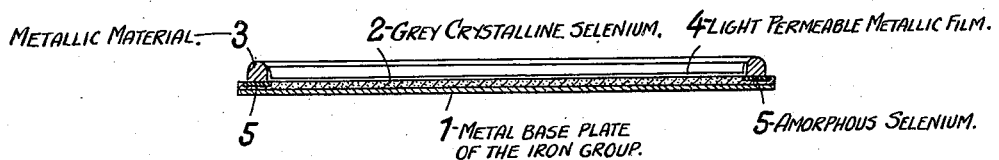
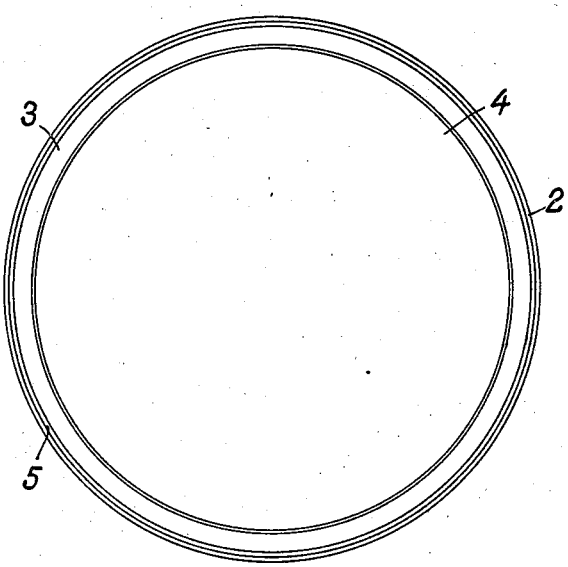
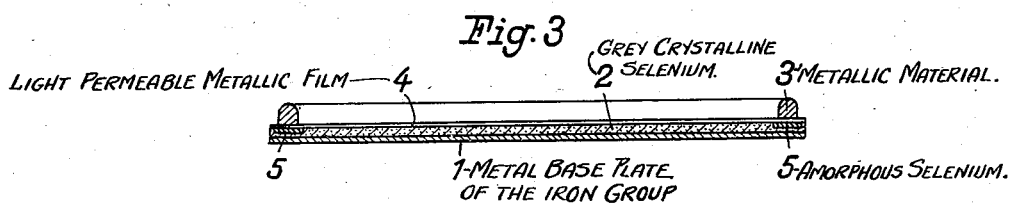
Inventor:
Otmar Geisler
by
Attorney.

Patented Dec. 31, 1940

2,226,716

UNITED STATES PATENT OFFICE 2,226,716

PHOTOELECTRIC CELL

Otmar Geisler, Nuremberg, Germany, assignor to Süddeutsche Apparate-Fabrik G. m. b. H., Nuremberg, Germany, a company Application July 1, 1939, Serial No. 282,389
In Germany July 14, 1938

5 Claims. (Cl. 136—89)

This invention relates to photoelectric cells, and more particularly to methods of and means for manufacturing photoelectric selenium cells.

Photoelectric elements or cells known in the art generally comprise a base plate, preferably of a metal of the iron group, serving as an electrode, a layer of selenium intimately united with one of the major surfaces of the base plate and converted into its grey crystalline condition in a heat treatment, and a light permeable film, e. g. of gold, overlying the grey crystalline selenium layer as the second or counterelectrode. In order to satisfactorily apply to an outer circuit the photoelectric current generated by the cell in response to light incident thereupon, an annular member or a meshwork of metal is disposed on the top of the thin light permeable electrode.

It is taught by experience that direct leakage paths might easily be set up for the photoelectric current from such annular member through the layer of selenium to the base plate electrode with the result that the efficiency of the photoelectric cell becomes substantially decreased. In order to avoid this drawback, propositions have been made in the past to provide a layer of insulation between the annular member and the selenium layer. Such layer may consist of a thin annular strip of insulation or a thin film of a suitable lacquer applied on the outer rim of the selenium layer and subsequently covered with a metallic coating sprayed thereonto or by a diecast ring of a metal capable of forming with the selenium a selenic compound of high electric resistivity.

However, an artificial layer of insulation between the selenium and the metallic ring above mentioned encounters the risk that the intermediate dielectric substance and the outer materials will not satisfactorily stick on one another, and this applies particularly when a lacquer forms the dielectric medium, in which case the upper metallic layer after a comparatively short time crumbles or peels off from the underlying insulation. Even chemical solvents contained in such layer of insulation may detrimentally affect the vacuum of the container forming part of the apparatus in which the light permeable electrode is applied onto the selenium layer in a cathodic sputtering process. Finally, glow discharges which may be set up during the last mentioned process are likewise apt to partially destroy this layer of insulation.

It is also a known expedient in the art to produce insulating layers of the aforementioned kind by means of a chemical reaction between the selenium layer and the overlying metal, but this method suffers under the disadvantage that such reaction gradually proceeds, thus tending to progressively convert this metal into a chemical compound either of low electric conductivity or, alternatively, of a certain degree of conductance incapable of involving sufficient insulating properties.

My invention consists in certain features of novelty which will fully appear from the following description and be pointed out in the appended claims, reference being made to the accompanying drawing, in which—

Fig. 1 is a cross section through a photo-electric cell according to this invention, Fig. 2 is a top view of the device shown in Fig. 1, while Fig. 3 shows a cross section of a further embodiment according to this invention.

In the figures, reference numeral 1 denotes a base plate, e. g., of a metal of the iron group, acting as one of the electrodes of the photoelectric cell. This base plate is coated with a layer 2 of selenium which has been converted into its grey crystalline condition. A metallic member acting as a connector between the photoelectric cell and an external circuit of which the cell forms part is fixedly applied on a zone or zones 5 of the selenium which for the purpose of producing insulating layer or layers have been converted into its amorphous state in a process hereinafter more closely described. This metallic member is embodied in the drawing as an annular member 3, by way of an example, but may likewise be a metallic meshwork or the like. The remaining grey crystalline surface or surfaces of the selenium and also the metallic member just mentioned are coated with a metallic film 4 pervious to light, such as gold, for example, serving as the second or counterelectrode of the cell.

The annular portion 5 of the grey crystalline selenium layer 2 in the figures is converted into its amorphous condition by means of a metallic stamp which is maintained at a temperature of approximately 300 degrees centigrade and pressed against this portion during a short period of time. This stamp which preferably consists of iron is suitably plated either with nickel or chromium in order to prevent sticking between the hot stamp and the selenium during the conversion thereof from its crystalline to its amorphous state. Now, the annular metallic member 3 is disposed on the zone of amorphous selenium and thus fully insulated from the grey crystalline selenium layer 2, so that the photoelectric current produced in the cell in response to light incident thereupon finds no leakage path from the annular member 3 to the base plate 1.

The embodiment according to Fig. 3 shows the light permeable electrode film 4 extended below the metallic member 3.

It has been mentioned in the introduction to this specification that the presence of artificial insulating layers in the heretofore known photoelectric cells introduces certain harmful effects when the light permeable electrode is applied by cathode sputtering, now, these effects are entirely overcome according to my invention since the photoelectric cell having its insulation formed by amorphous selenium between the base plate and the annular member does not contain any foreign substances which might detrimentally affect the conditions during the cathode sputtering. Moreover, the amorphous selenium involves higher and more beneficial insulating properties than any of the heretofore known selenium compounds produced for obtaining the desired insulating effect.

In order to cause the metallic member 3 to perfectly adhere on the zone or zones of amorphous selenium, this member may be roughened on its surface facing the amorphous selenium. Alternatively, the lower surface of the stamp with which the crystalline selenium is converted into amorphous selenium may be provided with grooves or be roughened in any suitable manner.

What is claimed is:

1. The method of producing photoelectric selenium cells which comprises, coating a base plate electrode with a layer of amorphous selenium, converting the amorphous selenium into its grey crystalline state in a heat treatment, re-converting zones of the grey crystalline selenium into the amorphous state, applying a metallic material on these zones of amorphous selenium, coating the surfaces of grey crystalline selenium and likewise the metallic material with a metallic film pervious to light, and subjecting the resulting product to a formation process.

2. The method of producing photoelectric selenium cells which comprises, coating a base plate electrode with a layer of amorphous selenium, converting the selenium into its grey crystalline state in a heat treatment, re-converting an annular surface of the selenium adjacent its circumference into its amorphous state, applying a metallic material on the annular surface of amorphous selenium, coating the inner surface of grey crystalline selenium and likewise the metallic material with a metallic film pervious to light, and subjecting the resulting product to a formation process.

3. The method of producing photoelectric selenium cells which comprises, coating a base plate electrode with a layer of amorphous selenium, converting the selenium into grey crystalline state in a thermal process, heat treating zones of the selenium at a temperature of approximately 300 degrees centigrade for reconverting these zones into their amorphous state and roughening said zones, applying a metallic material on said zones, coating the surfaces of grey crystalline selenium and likewise the metallic material with a metallic film pervious to light, and subjecting the resulting product to a formation process.

4. As a product of manufacture, a photoelectric selenium cell comprising a base plate electrode, a layer of grey crystalline selenium intimately united with the said base plate, zones of electrically non-conductive amorphous selenium in the said layer of grey crystalline selenium, a metallic material overlying the said zones of amorphous selenium as contacting means, and a metallic film pervious to light overlying the said grey crystalline selenium surfaces and the said metallic material as a second electrode.

5. As a product of manufacture, a photoelectric selenium cell comprising a base plate electrode, a layer of grey crystalline selenium metal united with the said base plate, zones of electrically non-conductive amorphous selenium in the said layer of grey crystalline selenium, a metallic material overlying the said zones of amorphous selenium as contacting means, and a metallic film pervious to light overlying the said grey crystalline selenium surface and making contact with the said metallic material as a second electrode.

OTMAR GEISLER.